US007697911B2

(12) United States Patent
Lai et al.

(10) Patent No.: US 7,697,911 B2
(45) Date of Patent: Apr. 13, 2010

(54) SINGLE PATH ARCHITECTURE WITH DIGITAL AUTOMATIC GAIN CONTROL FOR SDARS RECEIVERS

(75) Inventors: Yhean-Sen Lai, Warren, NJ (US); Robert C. Malkemes, Bethlehem, PA (US); Jie Song, Lower Macungie Township, PA (US); Denis P. Orlando, Freehold, NJ (US); Inseop Lee, Pittstown, NJ (US)

(73) Assignee: Agere Systems Inc., Allentown, PA (US)

( * ) Notice: Subject to any disclaimer, the term of this patent is extended or adjusted under 35 U.S.C. 154(b) by 626 days.

(21) Appl. No.: 11/608,449

(22) Filed: Dec. 8, 2006

(65) Prior Publication Data

US 2008/0139110 A1 Jun. 12, 2008

(51) Int. Cl.
*H04B 1/06* (2006.01)

(52) U.S. Cl. .................................... 455/232.1; 455/225

(58) Field of Classification Search ............. 455/234.1, 455/232.1
See application file for complete search history.

(56) References Cited

U.S. PATENT DOCUMENTS

2003/0194981 A1* 10/2003 Rimini et al. ............ 455/234.1
2005/0287975 A1 12/2005 Fishman et al.

OTHER PUBLICATIONS

Hong Jiang et al., "Satellite Digital Audio Receiver System, Automatic Gain Control White Paper," Agere Systems, Mar. 22, 2002, pp. 1-35.
J. H. Stott, "Explaining some of the magic of COFDM," Proceedings of the 20th International Television Symposium 1997, Montreux, Switzerland, Jun. 13-17, © BBC Research & Development 1997.

* cited by examiner

*Primary Examiner*—Tu X Nguyen
(74) *Attorney, Agent, or Firm*—Mendelsohn, Drucker, & Associates, P.C.; Steve Mendelsohn

(57) ABSTRACT

An SDARS receiver includes an analog front end configured to receive a composite signal. An A/D converter is coupled to the analog front end and converts the signal to a digitized signal. A digital down converter (DDC) is coupled to the A/D converter and down converts the digitized signal to a down converted signal. A demodulator demodulates the down converted signal. The receiver includes a digital automatic gain control (DAGC) coupled to an output of the A/D converter and before the demodulator. An automatic gain controller is coupled to the DAGC for providing an automatic gain control signal.

24 Claims, 7 Drawing Sheets

200

100

200

240

SINGLE PATH ARCHITECTURE WITH DIGITAL AUTOMATIC GAIN CONTROL FOR SDARS RECEIVERS

FIELD OF THE INVENTION

The present invention relates to analog front end architectures and automatic gain control in radio receivers and particularly to single path analog front end architectures and automatic gain controls for SDARS receivers.

BACKGROUND OF THE INVENTION

The latest in high-tech broadcast radio, Satellite Digital Audio Radio Service or System (SDARS), is capable of providing a new level of service to the subscribing public. SDARS promises to overcome several perceived limitations of prior broadcast forms. All such prior forms are "terrestrial," meaning that their broadcast signals originate from Earth-bound transmitters. As a result, they have a relatively short range, perhaps a few hundred miles for stations on the AM and FM bands. Therefore, mobile broadcast recipients are often challenged with constant channel surfing as settled-upon stations slowly fade out and new ones slowly come into range. Even within range, radio signals may be attenuated or distorted by natural or man-made obstacles, such as mountains or buildings. Radio signals may even wax or wane in power or fidelity depending upon the time of day or the weather.

Additionally, broadcast radio is largely locally originated. This constrains the potential audience that will listen to a particular station and thus the money advertisers are willing to pay for programming and on-air talent. While the trend is decidedly toward large networks of commonly-owned radio stations with centralized programming and higher-paid talent, time and regulatory change are required to complete the consolidation.

Finally, the Federal Communications Commission (FCC) defined the broadcast radio spectrum decades ago, long before digital transmission and even digital fidelity were realizable. The result is that the bandwidth allocated to a FM radio station is not adequate for hi-fidelity music, and the bandwidth allocated to an AM radio station is barely adequate for voice. This is especially true in a mobile environment.

SDARS promises to change all of this. A user who has an SDARS receiver in his vehicle (or home) can tune into any one of a hundred or more nationwide stations with the promise of near compact disc (CD) quality digital sound. Satellite redundancy and transcontinental coverage substantially provide immunity to service interruption both locally and on long trips.

While SDARS uses satellites for broad-area coverage, SDARS providers typically complement their satellite signals with gap-filling redundant broadcasts using terrestrial stations located in regions having poor or no satellite reception, such as cities with tall buildings, bridges and tunnels. The signals broadcast from the satellite and by the terrestrial stations contain the same audio data, and are typically on adjacent frequencies but use different coding techniques. The terrestrial signals are also typically broadcast at significantly higher signal strength, primarily because terrestrial stations have easy access to electrical power while satellites are limited to the electrical power available from their solar panels.

To promote competition in SDARS, the U.S. Government has divided the 25 MHz S-band allocated to SDARS into two equal 12.5 MHZ subbands and licensed those subbands to two independent service providers: Sirius Satellite Radio of NY, N.Y. and XM Satellite Radio of Washington, D.C. Each service provider operates its own independent transmission system, including its own constellation of satellites and its own network of terrestrial repeaters. The repeaters are located mostly, of course, in urban areas. FIG. 1 shows the relative frequencies and power levels of the signals in the Sirius system. Two geo-synchronous satellites transmit S band (2.3 GHz), time division multiplexed (TDM) signals directly to the end user's receiver. The terrestrial stations broadcast a coded orthogonal frequency division multiplexed (CODFM) signal containing the same audio data. The terrestrial COFDM signals are also broadcast at an S band frequency, lying between the frequencies of the two satellite TDM signals, and at a significantly higher power level.

The terrestrial repeater signals tend to be stronger than the satellite signals and because the Sirius and XM SDARS services occupy proximate subbands, the signals of one provider can interfere with the signals of the other causing degradation of the audio quality. A particular concern arises when a terrestrial repeater of one service introduces noise into the satellite signals of the other service. The noise plays havoc with the way SDARS receivers interpret the signals they are trying to receive.

FIG. 3 is a diagram of a prior art SDARS receiver 100 designed to receive and decode audio channels contained within the SDARS signals. The receiver 100 includes two decoding circuits 111 and 138, the former for decoding TDM signals directly from the satellites and the latter for decoding COFDM terrestrial signals. The combined signals—COFDM, TDM1 and TDM2—are received at a common antenna/low noise amplifier (LNA)/cable unit 102. TDM2 is a delayed version of TDM1. The receiver includes some front end processing before the decoding circuits 111, 138, including RF filter 104, such as a ceramic filter, a variable gain RF amplifier 106, an image rejection filter 108 and an RF mixer 112. Amplifier 106 amplifies the combined signal—COFDM, TDM1 and TDM2—centered at 2326.25 MHz. RF power detector 110 reports the RF power level to the TDM AGC controller 136 and to COFDM AGC controller 158, which will adjust the gain of the RF Amplifier 106 accordingly. RF Mixer 112 down-converts the combined signal to a first IF frequency, such as 315 MHz, which is bandpass filtered by first IF filter 114 and then split into two paths by splitter 116. One output of splitter 116 is applied to the TDM path. It is first applied to the TDM first IF amplifier 118, which is a variable gain amplifier. Following the TDM first IF amplifier 118, the TDM IF mixer 120 downconverts the combined signal to a second IF frequency, such as 75 MHz, which is bandpass filtered by TDM second IF filter 122 and applied to TDM second IF amplifier 124, which is also a variable gain amplifier. The output of the TDM second IF amplifier 124, which contains a downconverted and filtered version of the combined signal, is sampled by the TDM analog-to-digital converter (A/D converter) 126, at a TDM A/D sample rate, such as 60 MHz, with a TDM bit width, such as 10 bits.

The digitized signal from the TDM A/D converter 126 is then split and applied to both the TDM1 digital downconverter (DDC) 128 and the TDM2 digital downconverter (DDC) 130. With appropriate filtering, the TDM1 DDC 128 selects only the TDM1 signal and digitally downconverts it to a baseband signal of TDM1 bandwidth such as 4.5 MHz, and a TDM1 baseband sampling rate such as 30 MHz. With appropriate filtering, the TDM2 DDC 130 selects only the TDM2 signal and digitally downconverts it to a baseband signal of TDM2 baseband bandwidth such as 4.5 MHz, and a TDM2 baseband sampling rate such as 30 MHz. The TDM1 and TDM2 baseband signals are then demodulated with TDM1 Demodulator 132 and TDM2 Demodulator 134, respectively.

In the COFDM path, the other output of splitter 116 is first applied to the COFDM first IF amplifier 142, which is a variable gain amplifier. Following the COFDM first IF amplifier 142, the COFDM IF mixer 144 downconverts the combined signal to a second IF frequency, such as 75 MHz, which is bandpass filtered by COFDM second IF filter 146, which has a bandwidth narrow enough to filter out most of the TDM1 and TDM2 signals. The downconverted COFDM signal is then applied to COFDM second IF amplifier 148, which is also a variable gain amplifier. The output of the COFDM second IF amplifier 148, which contains a downconverted and filtered version of the COFDM signal, is sampled by the COFDM analog-to-digital converter (A/D converter) 150, at a COFDM A/D sample rate, such as 60 MHz, with a COFDM bit width, such as 10 bits.

The digitized signal from the COFDM A/D converter 150 is applied to the COFDM digital downconverter (DDC) 152. With appropriate filtering, the COFDM DDC 152 selects the COFDM signal and digitally downconverts it to a baseband signal of COFDM bandwidth such as 4.1 MHz, and a COFDM baseband sampling rate such as 30 MHz. The COFDM baseband signal is then demodulated with COFDM demodulator 156.

The A/D converters 126 and 150 each have a limited dynamic range. For a 10-bit A/D converter the dynamic range is about 60 dB. The size of the dynamic range plays an important role in digital radio reception. As long as the digitized signal is an accurate representation of the incoming analog signal, digital filtering techniques make it possible to extract very weak signals, such as those received from a satellite, even in the presence of a significant amount of noise. Accurate digitization requires that the incoming signal is amplified sufficiently to fill as much of the A/D converter's dynamic range as possible. It is, however, also very important not to over amplify the incoming signal since, when the A/D is overdriven and overflows, a small signal in a noisy background can be completely lost. This happens because the A/D converter simply truncates any excess signal.

The appropriate gain settings for IF variable gain amplifiers 118 and 124 of the TDM stage 111 that amplify the incoming signal to the optimal level for A/D converter 126 are controlled by TDM Automatic Gain Controller (AGC) 136. TDM AGC 136 controls the amplifiers 118 and 124 in response to the input signal level determined by the RF Power Detector 110 and the demodulated output signal levels from TDM1 Demodulator 132 and TDM2 Demodulator 134, labeled "TDM1 Post-filter" and "TDM2 Post-filter" in FIG. 3. TDM AGC 136 essentially monitors the two demodulated TDM signals and uses the stronger of the two demodulated TDM signals to set the gain of the amplifiers so that the portion of the received signal containing the best TDM signal is amplified appropriately, and a constant output level is obtained. TDM AGC 136 provides a control signal (labeled "TDM IF Gain") for controlling the gain of amplifiers 118 and 124 to amplify components of TDM 1 and TDM2 according to the algorithm of TDM AGC 136.

IF Variable gain amplifiers 142 and 148 of the COFDM stage 138 are controlled by COFDM AGC 158. Likewise the gain of RF amplifier 106 is controlled by COFDM AGC 158. The control signals "COFDM IF Gain" and "RF Gain" are provided by COFDM AGC 158 in response to the input signal levels from RF Power Detector 110, demodulated signal "COFDM Post-filter" from COFDM Demodulator 156 and digital down converted signal "COFDM Pre_filter" from COFDM DDC 152.

TDM AGC 136 and COFDM AGC 158 are incorporated within a microcontroller that monitors the digitized signal strength levels from the RF and IF elements, as well as the real and imaginary values from the matched filter within the demodulators, to calculate the desired gain control signals to maintain the signal levels in the linear region of the A/D converters 126, 150. The update rate of the IF automatic gain control (i.e. signals TDM IF Gain and COFDM IF Gain) is set at an IF gain update rate, such as 100 Hz. The update rate of the RF automatic gain control (i.e., signal RF gain) is set at an RF gain update rate, such as 50 Hz.

The prior art SDARS receiver 100 utilizes two analog front ends and at least two A/D converters, both of which undesirably consume power and contribute to implementation expense. Further, the receiver 100 tracks the overall TDM signal level instead of individual TDM1 and TDM2 levels separately, which results in sub-optimal performance for TDM reception. The receiver is also inefficient in that it includes separate TDM and COFDM AGC algorithms.

It is desirable to have a receiver with a single path to the analog-to-digital conversion, particularly from a power consumption concern. Practical implementation of a single front-end circuit of the type shown in FIG. 3 is not, however, simple. A major problem in such a circuit is that the amplifier gain settings for the two types of signals may be incompatible with each other. This causes difficulties if the amplifier gain is controlled using a simple, two-state AGC, with one state to optimize the gain for a COFDM signal and one state to optimize the amplifier gain for a TDM signal. In such a system, an amplifier gain that is optimal for the weak TDM signals from the satellite will typically over-amplify the incoming COFDM signal from the terrestrial stations, resulting in the COFDM signal overflowing the A/D converter's dynamic range. This overflow of the A/D converter's dynamic range results in demodulated COFDM audio data of very poor quality, and may even result in not being able to demodulate the COFDM audio at all. This overflow may also "blind" the receiver to the presence of the TDM signals.

Similarly, if the amplifier gain setting is optimal for the A/D converter to digitize the portion of the signal containing the stronger, COFDM signal, the portion of the signal containing the TDM signal will be under-amplified and poorly digitized by the A/D converter. The result is that if the receiver does lock on to a terrestrial COFDM signal, it may stay locked onto the terrestrial signal even if there is a better satellite signal available.

Therefore, improvements are desired in order to realize the power and cost savings attainable with an SDARS receiver using a single analog path and A/D.

SUMMARY OF THE INVENTION

A SDARS receiver is provided. The receiver includes an analog front end configured to receive a composite signal. An A/D converter is coupled to the analog front end and converts the signal to a digitized signal. A digital down converter (DDC) is coupled to the A/D converter and down converts the digitized signal to a down converted signal. A demodulator demodulates the down converted signal. The receiver includes a digital automatic gain control (DAGC) coupled to an output of the A/D converter and before the demodulator. An automatic gain controller is coupled to the DAGC for providing an automatic gain control signal.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
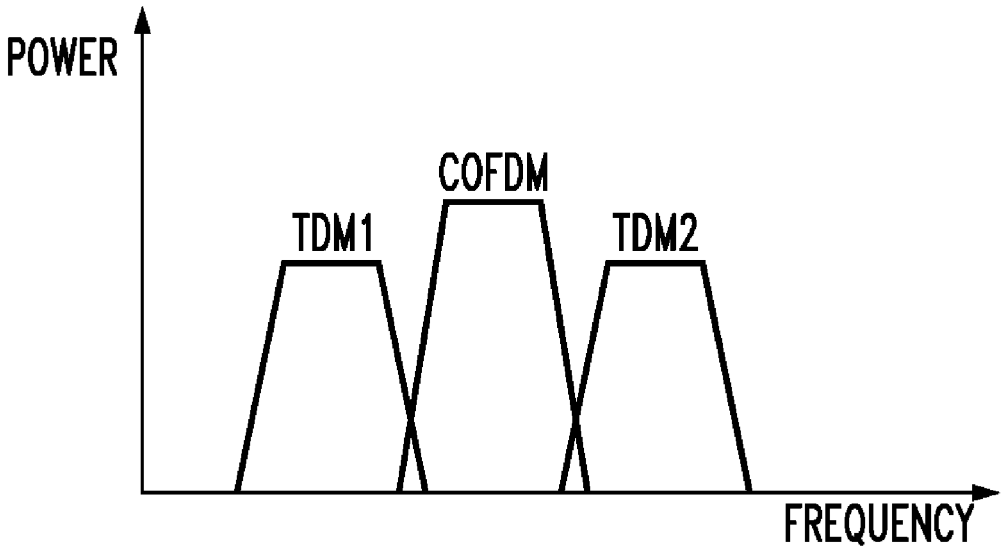
FIG. 1 shows the relative frequencies and power levels of the signals in an exemplary satellite digital audio radio (SDARS) system.
Figure 2:
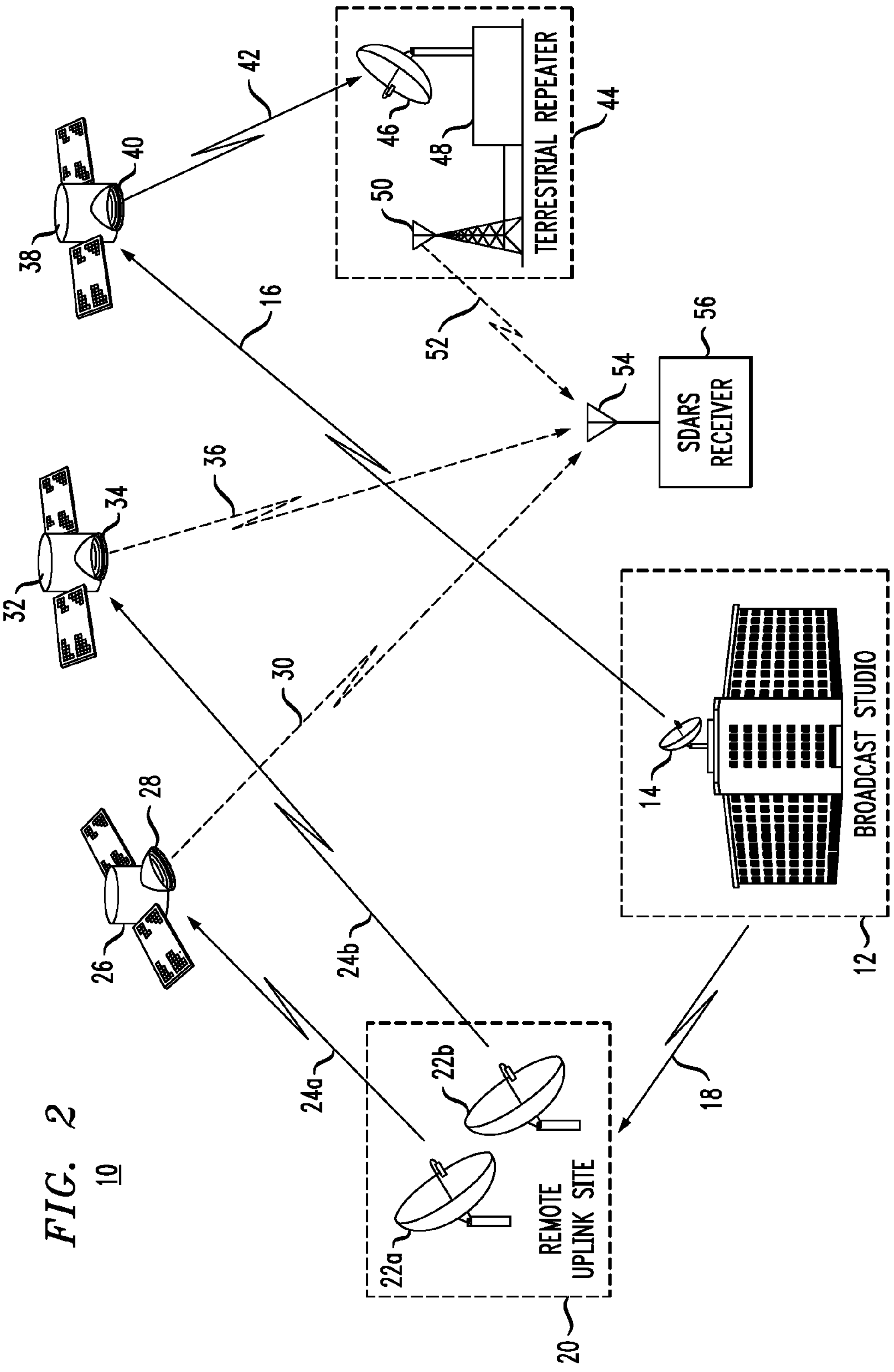
FIG. 2 is a schematic diagram of one embodiment of a Satellite Digital Audio Radio System (SDARS) incorporating an SDARS receiver.

Referring initially to FIG. 2, FIG. 2 is a highly schematic diagram of one embodiment of a Satellite Digital Audio Radio System, generally designated 10, incorporating an SDARS receiver 56 as described below in connection with FIGS. 4-7 according to the principles of the present invention. SDARS 10 includes an SDARS broadcast studio 12, a remote uplink site 20, first and second SDARS satellites 26, 32, a Very Small Aperture Terminal (VSAT) satellite 38 and a terrestrial repeater 44.

The SDARS broadcast studio 12 generates composite signals containing multiple audio and control channel signals. These composite signals are sent, via a remote transmission signal 18, to a remote uplink site 20 and via a remote transmission signal 16 to the VSAT satellite 38 via a VSAT uplink antenna 14. The remote uplink site 20 receives the remote transmission signal 18 and includes first and second satellite uplink antennas 22*a*, 22*b* to direct the SDARS broadcast to the first and second SDARS satellites 26, 32. The first and second SDARS satellites 26, 32 include first and second SDARS satellite antennas 28, 34, respectively. The VSAT satellite 38 includes a VSAT satellite antenna 40. The terrestrial repeater 44, which is one of a network of terrestrial repeaters, includes a VSAT downlink antenna 46, a repeater signal conditioner 48 and a terrestrial repeater antenna 50. The composite signal is transmitted from the VSAT satellite antenna 40 to the VSAT downlink antenna 46 via the VSAT broadcast signal 42.

SDARS 10 operates in the S-band frequency range and provides near compact disc (CD) quality audio programming to a subscriber. The SDARS broadcast provider transmits first and second satellite broadcast signals 24*a*, 24*b* to each of the first and second SDARS satellites 26, 32 employing the first and second satellite uplink antennas 22*a*, 22*b*, respectively. Each of the first and second satellite broadcast signals 24*a*, 24*b* contains a collection of separate channels, or clusters, available for selection by the subscriber. In the illustrated embodiment, first and second TDM satellite signals 30, 36 are quadrature phase shift keyed modulated (TDM/QPSK).

In parallel with these TDM satellite transmissions, the SDARS broadcast studio 12, the VSAT satellite 38 and the terrestrial repeater 44 cooperate to provide terrestrial broadcast signal 52. This terrestrial broadcast signal employs a coded orthogonal frequency division multiplex (COFDM) modulation method that provides a stronger, but shorter-ranged, version of the first and second TDM satellite signals 30, 36. As shown, the VSAT broadcast signal 42 is transmitted from the VSAT satellite antenna 40 to the VSAT downlink antenna 46 of the terrestrial repeater 44. The signal conditioner 48 element of the terrestrial repeater 44 converts the format of the VSAT broadcast signal 42 to the format of the terrestrial broadcast signal 52.

The SDARS receiver 56 employs a single signal antenna 54 for receiving TDM satellite signals 30, 36 and for receiving COFDM signal 52 and includes RF/IF and digital portions that will be described more particularly with reference to FIGS. 4-7.

Figure 4:
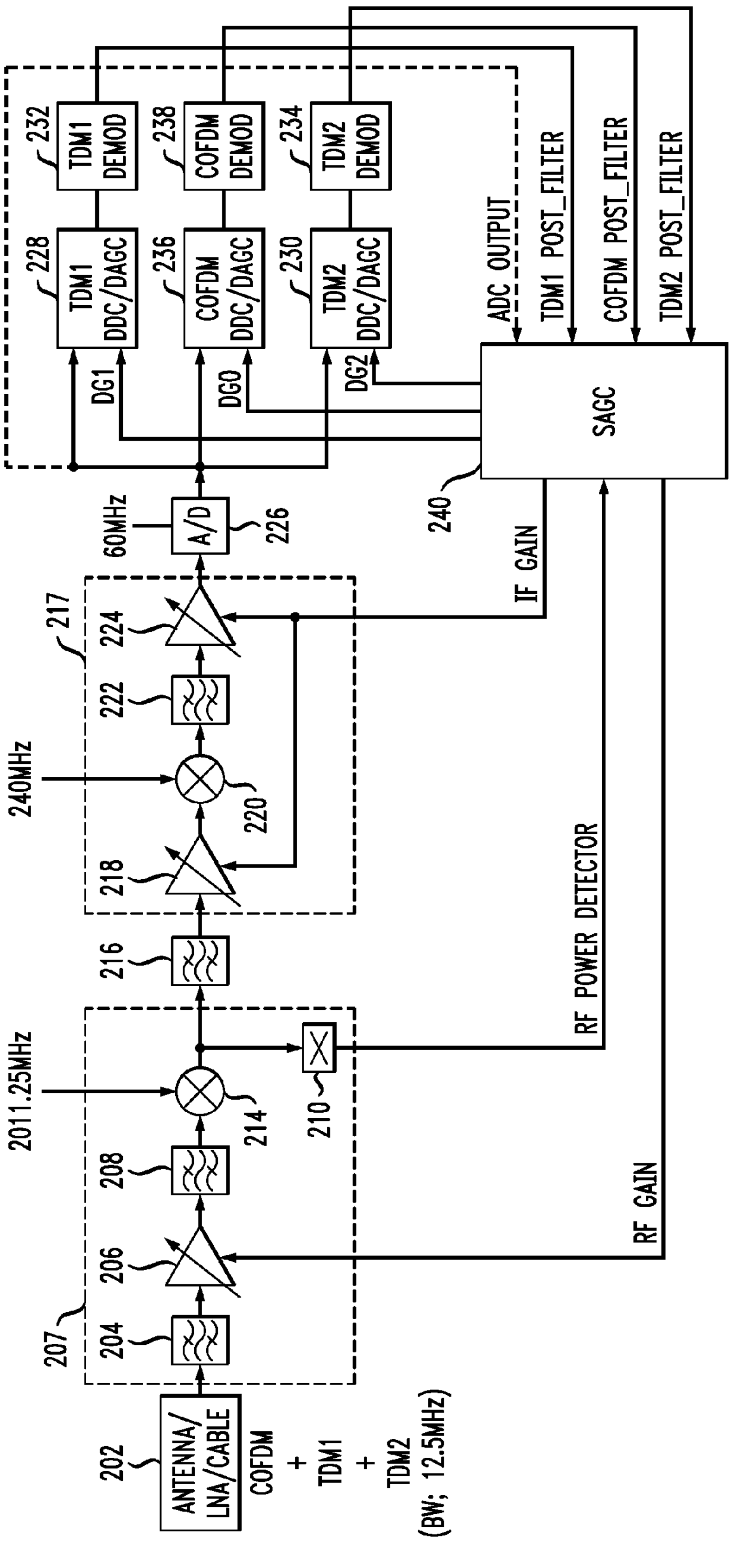
FIG. 4 is a circuit diagram of an exemplary embodiment of a single path architecture for digital gain control in an SDARS receiver.

FIG. 4 is a block diagram of an exemplary embodiment of a single path architecture for digital automatic gain control in an SDARS receiver. This architecture provides an integrated single path architecture with excellent performance. In various embodiments, some advantages of the design include: (1) an integrated RF/IF AGC to maintain the overall power of both TDM and COFDM signals within specified ranges at the A/D input, so as to provide a smooth transition between TDM and COFDM; and (2) three independent DAGC multipliers, one for each TDM1, TDM2, and COFDM signal path, such that every signal path has its level maintained at a desired level. By tracking signal power for TDM 1 and TDM2 separately, the power level of TDM 1 and TDM2 can each be optimized for the respective demodulator that follows the digital down conversion.

Figure 3:
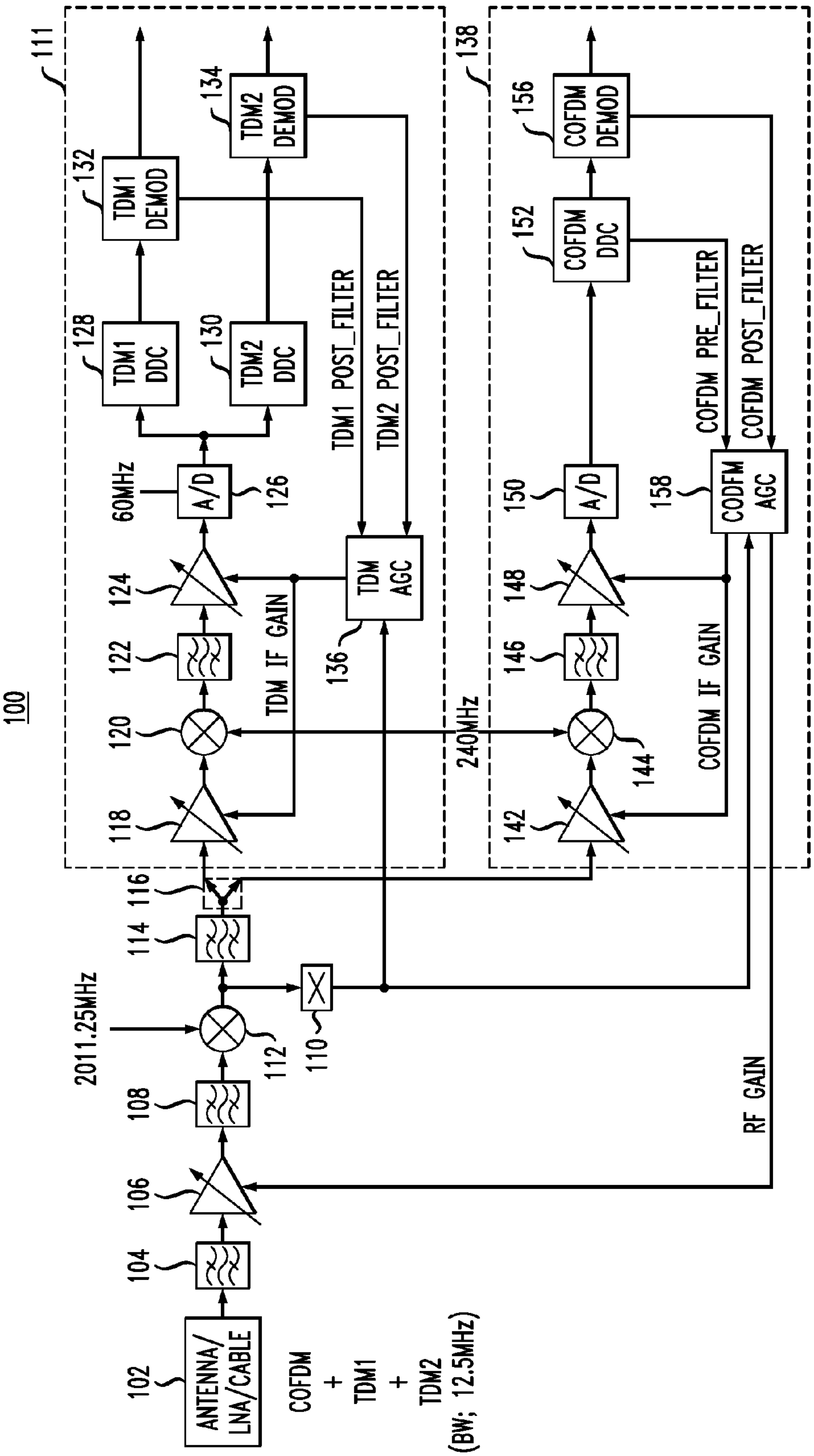
FIG. 3 PRIOR ART
FIG. 3 is a circuit diagram of a prior art SDARS receiver.

The AGC function of the SDARS receiver system 200 is partitioned in an RF portion, an IF portion and in a Digital AGC portion after the A/D conversion. The RF portion and IF portion form part of the analog front end of the receiver system 200. Like the SDARS receiver 100 of FIG. 3, the SDARS receiver 200 includes an antenna/LNA/cable unit 202, an RF portion 207, IF portion 217, IF filter 216 between the RF and IF portions 207 and 217, and A/D 226. The RF portion 207 includes RF filter 204, variable gain RF amplifier 206, image rejection filter 208, RF power detector 210 and RF mixer 214. The IF portion 217 includes variable gain first IF amplifier 218, IF mixer 220, IF filter 222 and a variable gain second IF amplifier 224.

The composite signal is received from the two satellites (which provide signals TDM1 and TDM2) and from terrestrial repeater (which provides signal COFDM) by antenna/LNA/cable unit 202. The composite signal from unit 202 is filtered by filter 204 and amplified by RF amplifier 206. RF power detector 210 reports the RF power level to the SAGC controller 240, which will adjust the gain of the RF Amplifier 206 as necessary. RF Mixer 214 down-converts the combined signal to a first IF frequency, such as 315 MHz, which is bandpass filtered by first IF filter 216. The downconverted composite signal is then applied to the first IF amplifier 218, which is a variable gain amplifier. Following the first IF amplifier 218, the IF mixer 220 downconverts the combined signal to a second IF frequency, such as 75 MHz, which is bandpass filtered by the second IF filter 222 and applied to the second IF amplifier 224, which is a variable gain amplifier. The output of the second IF amplifier 224, which contains a downconverted and filtered version of the combined signal, with a total bandwidth of 12.5 MHz (TDM1+TDM2+

COFDM) is sampled by the analog-to-digital converter (A/D converter) 226, at an A/D sample rate, such as 60 MHz, with an A/D bit width, such as 10 bits.

The SDARS receiver 200 includes functional modules TDM1 DDC/DAGC 228, TDM2 DDC/DAGC 230 and COFDM DDC/DAGC 236. These modules are similar to each other with minor parameter differences, such as filter tap size and sampling rate. DDC is an acronym for digital down conversion or converter, and DAGC is an acronym for digital automatic gain control or controller. The output of TDM1 DDC/DAGC module 228 is provided to TDM1 Demodulator 232; the output of TDM2 DDC/DAGC module 230 is provided to TDM2 Demodulator 234; and the output of COFDM DDC/DAGC module 236 is provided to COFDM Demodulator 238. The output signals from the demodulators 232, 234 and 238 are provided to SAGC (single path automatic gain control) module 240, which provides amplifier gain control signals RF Gain and IF Gain and digital automatic gain control signals DG0, DG1 and DG2 as described below responsive to the power of the demodulated signals, the RF signal power and optionally the A/D output power signal. The operation of this automatic gain control architecture and structure is described below.

Digitized data from the A/D converter 226 are digitally down-converted and filtered to signals TDM1 (4.5 MHz—Low Bandwidth), COFDM (4.1 MHz—Center Bandwidth), and TDM2 (4.5 MHz—Upper Bandwidth) with a digital down-converter. As will be understood by those skilled in the art, the digital down conversion is a mixing operation on the sampled signal that digitally separates the TDM1, TDM2 and COFDM signals from the digitized composite signal. Those skilled in the art understand the structure and function of the DDCs. There is also a Digital Automatic Gain Control (DAGC) (e.g., a multiplier or variable gain amplifier) inside each of the three modules 228, 236 and 230 to provide the digital automatic gain control, i.e., to fine tune the digital power level of each signal to the desired power level required by the demodulator that follows it, in response to control signals DG1, DG0 and DG2 received from SAGC 240. The desired level is specified by the TDM/COFDM SetPoint discussed below in connection with FIG. 7. The power adjustment can come before, within or after the digital down conversion within the modules 228, 236, 230.

The SAGC block 240 includes power calculation software/hardware therein. The SAGC block 240 monitors the real and imaginary values from the matched filters (from the TDM Demodulators 232, 234) and Fast Fourier Transform (FFT) (from COFDM Demodulator 238) to calculate the desired gain control levels for the RF/IF gains and for the three DAGCs in modules 228, 230, 236 to maintain the signal levels of each individual signal stream in the desired region needed by the following demodulator. The RF/IF gains are controlled by signals RF Gain and IF Gain, respectively, from SAGC 240. The RF AGC component of the SAGC maintains the wideband RF signal (including SDARS composite signal, plus some adjacent signals such as the XM signal) in the linear dynamic range of the RF amplifier 206 and RF mixer 214 specified by the RF setpoint. The IF AGC component maintains the 12.5 MHz SDARS signal within the ADC dynamic range specified by the ADC setpoint through control of IF amplifiers 218, 224. The DAGC component maintains the filtered output signals of the TDM1 DDC/DAGC 228 and the TDM2 DDC/DAGC 230 at the TDM_PostSetpoint needed by the TDM1 and TDM2 demodulators 232, 234. Likewise, the DAGC component maintains the filtered output signal of the COFDM DDC/DAGC 236 at the COFDM_PostSetpoint needed by the COFDM demodulator 238. Additionally, the SAGC block could also monitor the digitized signal strength levels from the output of A/D 226 to adjust the RF and IF amplifiers 206, 218, 224 in order to maintain the overall signal power of the composite signal within the specified range.

Although not shown in FIG. 4, it should be understood that the outputs of the demodulators 232, 234, 238 are combined to form a final output of the SDARS receiver 200.

The use of three DAGCs provides for excellent performance. By having two separate DAGCs for TDM1 and TDM2, the system 200 can handle strong interference, such as from XM (in a Sirius system, or vice versa in an XM system) and weak signals in foliage areas, because the two TDM paths are tracked independently. The receiver can also track TDM1, TDM2, and COFDM signals simultaneously without switching between TDM and COFDM.

With respect to the RF and IF control signals of FIG. 4, both control signals RF Gain and IF Gain include components that control the amplifiers 206, 218, 224 individually with respect to the RF power detector 210 output, the output power of A/D 226, and the power of signals TDM1 Post_Filter, TDM2 Post_Filter and COFDM Post_Filter. Also, the new architecture requires only one analog front end and one A/D converter 226 to achieve at least comparable performance to the receiver 100 of FIG. 3, while allowing for power consumption to be reduced by almost 50% as well as a significant reduction in parts cost.

Figure 5:
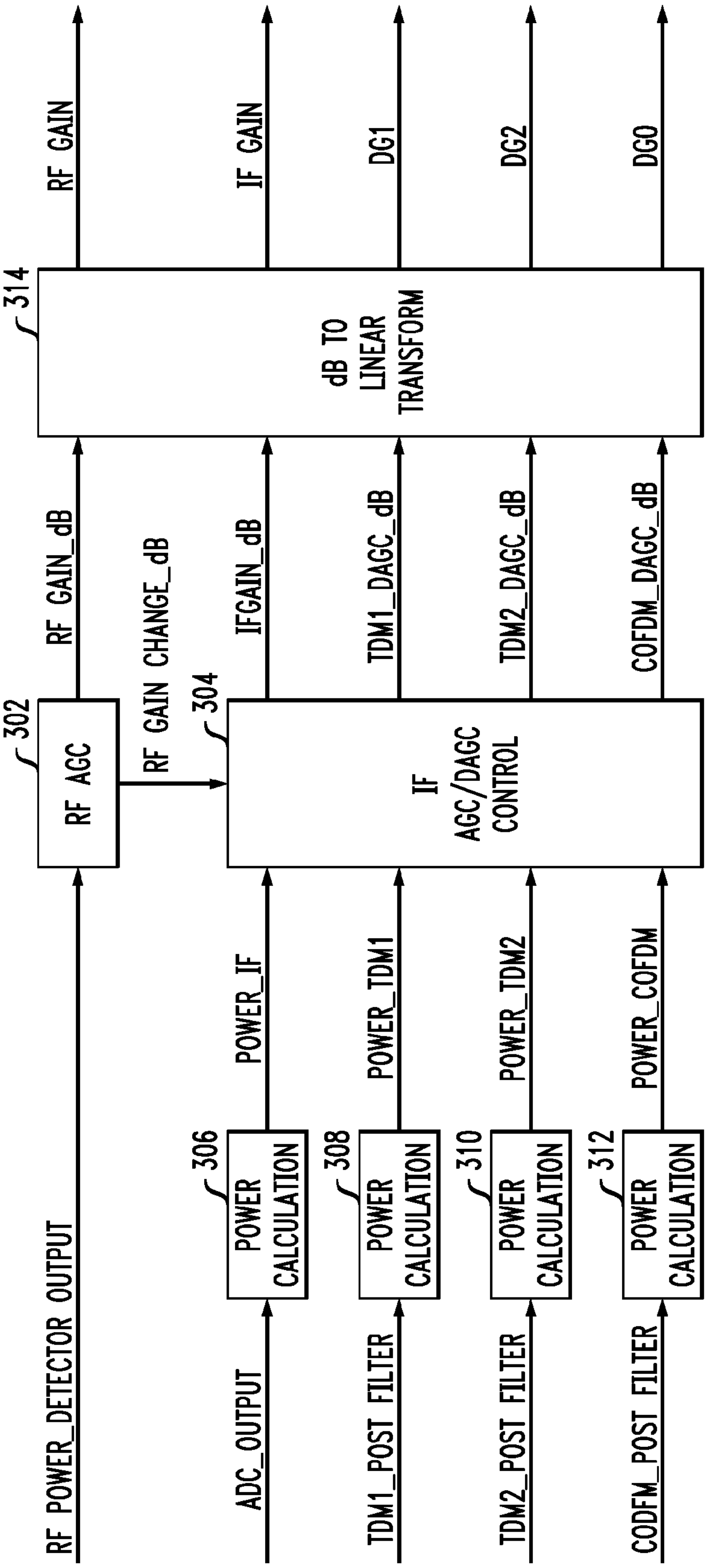
FIG. 5 is a block diagram of the SAGC module of the circuit of FIG. 4.
Figure 6:
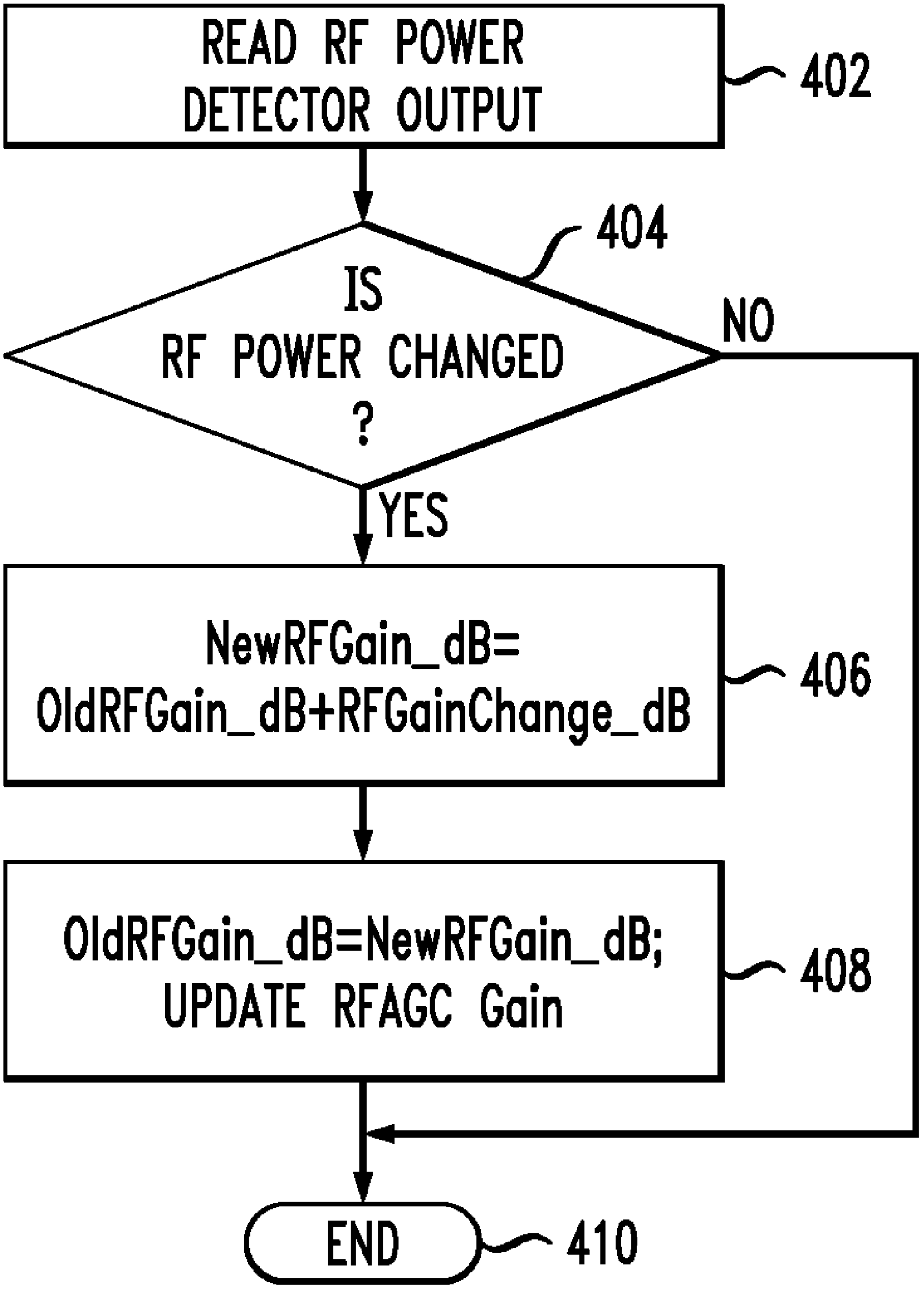
FIG. 6 is a flow diagram of the RF automatic gain control function of the SAGC module of FIG. 5.
Figure 7:
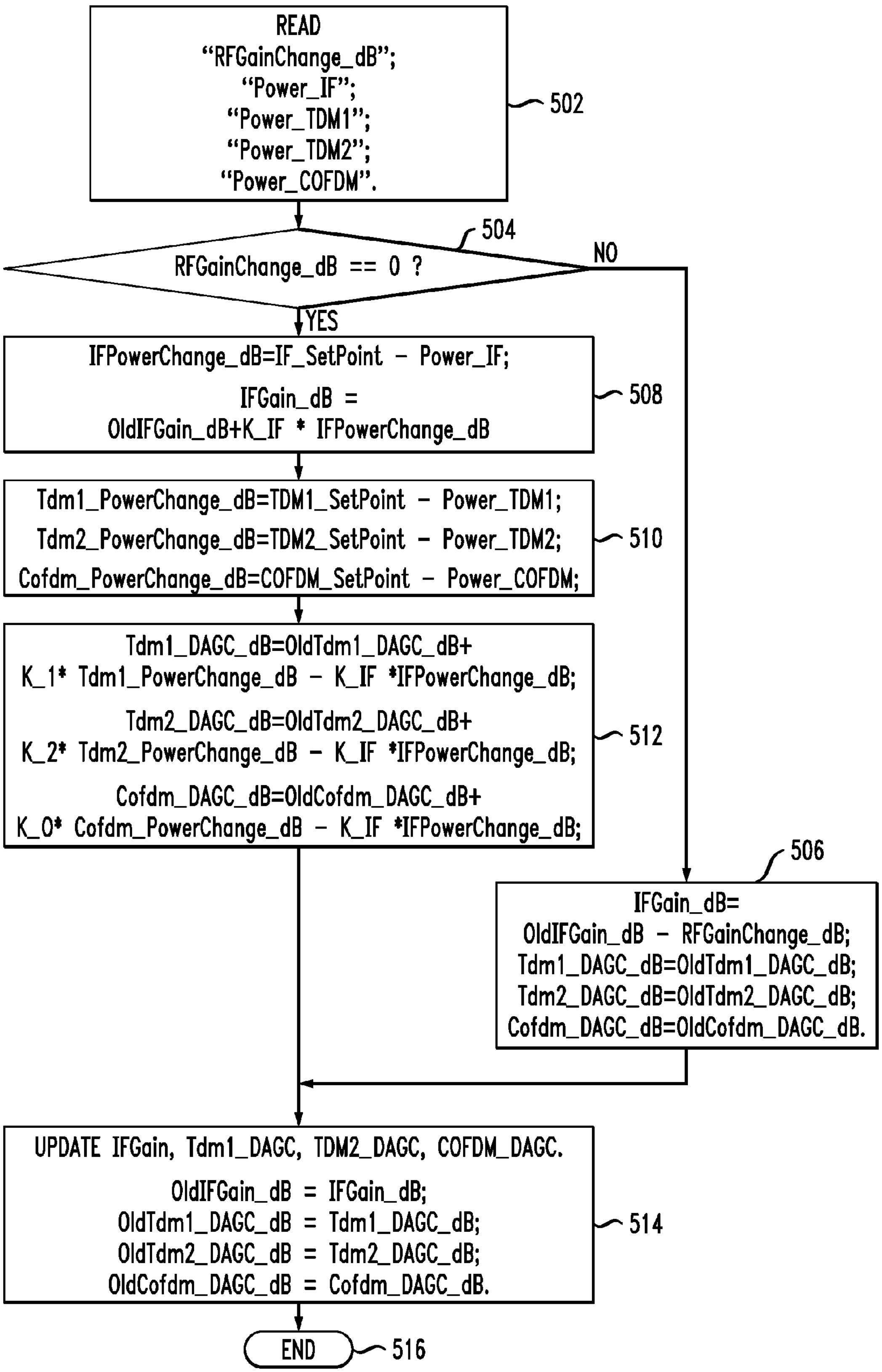
FIG. 7 is a flow diagram of the IF automatic gain control function and digital automatic gain control functions of the of the SAGC module of FIG. 5.

FIGS. 5-7 illustrate the operation of an exemplary SAGC module 240. FIG. 5 is block diagram of the SAGC module 240 of the circuit of FIG. 4. The SAGC module 240 provides both RF and IF AGC control as well as DAGC control. The RF AGC control runs autonomously to maintain the input RF power in a specified range, specifically defined as the RF power setpoint. As shown in FIG. 5, the SAGC module 240 includes hardware and/or software represented functionally as interconnected modules. SAGC module 240 includes power calculation modules 306, 308, 310 and 312. As those skilled in the art will understand, various approaches may be employed to calculate the power level of each signal. For example, the square of the complex components of the signal can be calculated and averaged. In an alternative embodiment, the maximal can be used to calculate power. Power calculation module 306 calculates the power level of the A/D output and provides signal Power_IF representative thereof; module 308 calculates the power level of the TDM1 signal and provides signal Power_TDM1 representative thereof; module 310 calculates the power level of the TDM2 signal and provides signal Power_TDM2 representative thereof, and module 312 calculates the power level of the COFDM signal and provides signal Power_COFDM representative thereof. These four power level signals are provided to IF AGC/DAGC control module 304, which provides four IF decibel control signals—IFGain_db, Tdm1_DAGC_db, Tdm2_DAGC_db and Cofdm_DAGC_db—based thereon and based on signal RFGainChange_dB received from RF AGC module 302. These signals represent decibel levels to which the controlled analog and digital amplifiers are to be set. These signals are provided to dB to Linear Transform module 314 which converts the decibel values to linear values that provide the IF control signals IF Gain, DG1, DG2 and DG0 shown in FIG. 4. The decibel value is related to the linear value as 10*log 10(linear value). In embodiments, in the "dB to Linear Transform" block in FIG. 5, the linear value is obtained from its decibel value using software programmed with code for doing the calculation Linear=$10^{db/10}$.

As also shown in FIG. 5, RF AGC module 302 provides the signal RF Gain_dB based on signal RFPower_Detector Output. As will be understood by those skilled in the art, signal RFPower_Detector Output is available from the RF power detector 210, and the details of this power calculation need not be described herein. The RF Gain control signal is provided by module 314 and based on decibel signal RF Gain_dB.

FIG. 6 is a flowchart illustrating exemplary RF AGC control within block 302 of FIG. 5. Whenever an RF signal power change is shown by signal RFPower_Detector Output, a new RF gain control signal will be issued by compensating the old RF gain control signal with the detected RF power change. At step 402, the RF Power is obtained by reading signal RF Power_Detector Output. This signal is available from the RF power detector 210 and may be read continuously or periodically, such as at an update rate of 50 Hz. At step 404, it is determined whether the RF power has changed from a previously read (or detected) RF power from the RF power detector 210. If the power has not changed, the algorithm is complete (step 410) until the next RF power detection read (Step 402). If the RF power has changed, a new RF gain is determined for the RF amplifier 206 by adjusting the old RF gain setting with the RF gain corresponding to the power change to maintain the power level at the set point (Step 406). More specifically, the RF Gain change (RFGainChange_dB=RF SetPointdB−RF Power_dB, which could be either positive or negative) is added to the old RF gain to provide the new RF gain. The new RF gain level then replaces the old RF gain level in the local memory and the new RF gain setting is provided to the RF amplifier 206 to control its gain (Step 408). The read RF Power (step 402) is also saved for use in the next iteration of comparison step 404. The algorithm is then complete (Step 410) until the next RF power detection read (Step 402).

RF Gain change will affect the power level of the composite SDARS signals in the system of FIG. 4 following the RF amplifier 206. The IF AGC portion of module 304 needs to adjust the gain of IF amplifier 218 and 224 accordingly to maintain ADC input single within a specified range. Similar actions may be performed by the DAGC portion of module 304 to adjust DG1, DG2, and DG0, which control the gain of TDM1DDC/DAGC 228, TDM2 DDC/DAGC 230 and COFDM DDC/DAGC 236, respectively.

FIG. 7 shows a process flow for the IF AGC and DAGC control within module 304 of SAGC 240. At step 502, the IF/DAGC controller 304 reads calculated power level signals "Power_IF" based on the output of A/D 226, "Power_TDM1" and "Power_TDM2" based on the complex samples from the outputs of the matched filters in TDM1 and TDM2 demodulators 232, 234, and "Power_COFDM" based on complex samples from the FFT output in COFDM Demodulator 238. The RF_Gain change_dB signal is also read from the RF AGC module 302. At step 504, if there is no change in the RF gain level issued by RF AGC module 302 (that is, if RFGainChange_dB≈/=0), then the algorithm proceeds to step 508. At step 508, the required IF power change is determined by calculating the difference between parameter IF_SetPoint and Power_IF. IF_SetPoint represents the desired signal level at the A/D 226 output as control by the input level thereto set by IF amplifiers 218, 224. This difference between the desired power level and the calculated power level is used to derive a new "IFgain_dB." The IF gain is set by adding the previous IF gain ("OldIFGain_db") with K_If*IFPowerChange_db, where K_If is a scaling factor in the range of (0, 1), and IFPowerChange_dB is the difference between IF_SetPoint and Power_IF. Though it depends on how IFpowerchange_dB is calculated, for this example, if Power_IF is larger than the IF_Setpoint, then the AGC should reduce the IF gain. Now since "IFPowerCHange_dB=IF_setpoint-power_IF" is negative, the new IF gain should be equal to old_IF gian+IFPowerCHange_dB. The same concept is true for RF AGC. The three DAGC gains for the multipliers of modules 228, 230, 236—"TDM1_DAGC_dB", "TDM2_DAGC_dB" and "COFDM_DAGC_dB"—are set at steps 510 and 512. At step 510, the required TDM1 signal power change is calculated by determining the difference between TDM1_SetPoint and the calculated TDM1 power ("Power_TDM1"). Parameter TDM1_SetPoint represents the desired TDM1 signal power level at the matched filter output of TDM1 demodulator. In the same manner, the required TDM2 signal power and COFDM signal power changes are calculated. At step 512, the new TDM1, TDM2 and COFDM gains are calculated by adding the previous gain (i.e., "OldTdm1_DAGC_db", "OldTdm2_DAGC_db", "OldCofdm_DAGC_db") with the scaled power difference between the corresponding desired power level "TDM1_Setpoint", "TDM2_Setpoint", "COFDM_Setpoint", and the calculated baseband power "Power_TDM1", "Power_TDM2", "Power_COFDM", respectively. To decouple the IF gain and DAGC gain, the IF gain change "K_If*IFPowerChange_dB" is also subtracted from the DAGC gains.

At step 514, the decibel gain values are transformed by linear conversion module 314 (FIG. 5) to linear values labeled as control signals "IF Gain," "DG0," "DG1" and "DG2," which are available for control of the individual amplifiers or multipliers to control their gain. The old decibel values are updated with the new decibel values for later use (i.e., in subsequent executions of the algorithm). The algorithm is complete at 516 until step 502 is again performed. In one embodiment, the algorithm of FIG. 7 is run at an update rate of 100 Hz.

It should be noted that other variations of the IF/DAGC control function may be utilized to derive the IF gain and the three DAGC gains. For example, use of Power_If is optional. In this embodiment, the system uses the maximum of effective "Power_TDM1", "Power_TDM2", and "Power_COFDM" to drive the IF gain. The feedback power can be from the ADC output, the DDC output, and the demodulator output, or some subset thereof.

At step 504, if a change in the RF gain is detected, then step 506 is performed. The IF gain is set to the old IF gain minus the change in the RF gain to make up the signal power change caused by the RF gain change. The three DAGC gains are maintained at their present values to wait for the RF and IF gain changes to settle. In the following AGC cycles when there is no RF AGC change, steps 508 to 512 are performed. The algorithm then proceeds to step 514 described above.

This single path AGC structure can perform as well or better than the AGC architectures of the prior art because of the added three DAGCs. By having two separate DAGCs for TDM1 and TDM2, it can handle the strong XM (or Sirius) interference and foliage areas because the two TDM paths are tracked independently. It can also track TDM1, TDM2, and COFDM signals simultaneously without switching between TDM and COFDM. Further, this new architecture has significant cost and power consumption advantages over previous architectures.

Those skilled in the art will recognize that the single path architecture concept and AGC control algorithm described above can be applied to direct down conversion, or zero-IF structure where the RF signal is directly converted to baseband complex signals. The composite signal received by the SDARS received described herein can also include any combination or subset of the TDM1, TDM2 and COFDM signals.

Further, the composite signal can be applied to other multiple signal source communication systems beyond satellite radio system.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

The invention claimed is:

1. A satellite digital audio radio service (SDARS) receiver, comprising:

an analog front end configured to receive a composite signal;

an analog to digital (A/D) converter coupled to the analog front end and configured to convert said signal to yield a digitized signal;

a digital down converter (DDC) coupled to said A/D converter and configured to down convert said digitized signal to yield a down converted signal;

a demodulator to demodulate said down converted signal;

a digital automatic gain control (DAGC) coupled to an output of said A/D converter and disposed before said demodulator; and an automatic gain controller coupled to the DAGC for providing a digital automatic gain control signal.

2. The SDARS receiver of claim 1:

wherein said composite signal comprises first and second satellite signals and a terrestrial signal;

wherein said A/D converter converts said composite signal to yield a digitized composite signal;

wherein said DDC down converts said digitized composite signal to yield down converted first and second satellite signals and a down converted terrestrial signal;

wherein said demodulator includes first, second and third demodulators to demodulate said down converted first and second satellite signals and said down converted terrestrial signal, respectively;

wherein said DAGC includes first, second and third DAGCs coupled to an output of said A/D converter associated with said first and second satellite signals and said terrestrial signal, respectively, and disposed before said first, second and third demodulators, respectively; and wherein said automatic gain controller is coupled to said first, second and third DAGCs for providing respective first, second and third digital automatic gain control signals.

3. The SDARS receiver of claim 2 wherein said analog front end is configured to provide gain to the composite signal in accordance with the operation of the A/D converter.

4. The SDARS receiver of claim 3, wherein the analog front end comprises:

an RF variable gain amplifier (VGA) and at least one IF VGA configured to amplify said composite signal in response to an automatic gain control (AGC) signal provided by said automatic gain controller.

5. The SDARS receiver of claim 4, wherein said at least one IF VGA comprises first and second IF VGAs.

6. The SDARS receiver of claim 4, wherein said AGC signal comprises an RF AGC signal for said RF VGA and an IF AGC signal for said at least one IF VGA.

7. The SDARS receiver of claim 2, wherein said DDC comprises first, second and third DDCs for yielding said down converted first and second satellite signals and down converted terrestrial signal.

8. The SDARS receiver of claim 7, wherein said first, second and third DAGCs are disposed before said first, second and third DDCs, respectively.

9. The SDARS receiver of claim 2, wherein said analog front end comprises at least a first variable gain amplifier (VGA) configured to amplify said composite signal in response to an automatic gain control (AGC) signal provided by said automatic gain controller, wherein said AGC signal comprises at least an RF AGC signal, said automatic gain controller monitoring changes in RF power of said composite signal and adjusting an RF gain of said VGA in response to changes in said RF power.

10. The SDARS receiver of claim 9, wherein said analog front end includes an RF module including said first VGA and including a down converter for down converting said composite signal to a first intermediate frequency.

11. The SDARS receiver of claim 9, wherein said analog front end includes at least a second variable gain amplifier (VGA) configured to amplify said composite signal in response to said automatic gain control (AGC) signal provided by said automatic gain controller, wherein said AGC signal further comprises an IF AGC signal, wherein said automatic gain controller monitors at least the power of the digitized composite signal, compares the power of said digitized composite signal to a desired power level and adjusts an IF gain of said second VGA based on said comparison.

12. The SDARS receiver of claim 11, wherein said analog front end includes an IF module including said second variable gain amplifier and including a down converter for down converting said composite signal to an intermediate frequency.

13. The SDARS receiver of claim 12, wherein said automatic gain controller monitors at least the respective powers of the demodulated down converted first and second satellite signals and demodulated down converted terrestrial signal, compares the monitored powers against respective desired power levels and adjusts gains represented by said digital first, second and third automatic gain control signals based on said comparison.

14. A single path automatic gain control (AGC) system for a composite signal comprising at least one satellite signal and at least one terrestrial signal in a satellite digital audio radio service (SDARS) receiver, comprising:

an analog front end configured to receive said composite signal, said analog front end including an RF module configured to provide gain for the composite signal in response to an RF AGC control signal and an IF module coupled to an output of the RF module and configured to provide gain to the composite signal in response to an IF AGC control signal;

an analog to digital (A/D) converter coupled to an output of the IF module of the analog front end and configured to convert said composite signal to yield a digitized composite signal;

a digital down converter (DDC) coupled to said A/D converter and configured to down convert said digitized composite signal to yield a down converted satellite signal and a down converted terrestrial signal;

first and second demodulators to demodulate said down converted satellite signal and said down converted terrestrial signal, respectively;

first and second digital automatic gain controls (DAGC) coupled to an output of said A/D converter associated with said satellite signal and said terrestrial signal, respectively, and disposed before said first and second demodulators, respectively; and an automatic gain controller coupled to said first and second DAGCs for providing respective first and second digital automatic gain control signals, and coupled to said RF and IF modules for providing said RF and IF AGC control signals.

15. The system of claim 14, wherein said RF module comprises an RF variable gain amplifier (VGA) responsive to said RF AGC control signal, and said IF module comprises a pair of IF VGAs responsive to said IF AGC control signal.

16. The system of claim 14, wherein said DDC comprises first and second DDCs for yielding said down converted satellite signal and down converted terrestrial signal.

17. The system of claim 14, wherein said automatic gain controller comprises an RF AGC module, said RF AGC module monitoring changes in RF power of said composite signal and adjusting an RF gain of said RF module in response to changes in said RF power.

18. The system of claim 17, wherein said RF module includes a down converter for down converting said composite signal to a first intermediate frequency (IF), and said IF module includes a down converter for down converting said composite signal to a second IF.

19. The system of claim 17, wherein said automatic gain controller includes an IF AGC module, said IF AGC module monitoring at least the power of the digitized composite signal, comparing the power of said digitized composite signal to a desired power level and adjusting an IF gain of said IF AGC module based on said comparison.

20. The system of claim 14, wherein the automatic gain controller includes a digital automatic gain control module that monitors at least the respective powers of the demodulated down converted satellite signal and demodulated down converted terrestrial signal, compares the monitored powers against respective desired power levels and adjusts gains represented by said digital first and second automatic gain control signals based on said comparison.

21. A method of automatic gain control in a satellite audio radio service (SDARS) receiver, comprising the steps of:

digitizing a composite signal received in said SDARS receiver to yield a digitized composite signal comprising at least first and second components;

down converting said digitized composite signal to yield at least down converted first and second signals corresponding to said at least first and second components;

demodulating said down converted first and second signals to yield demodulated down converted signals; and providing separate digital automatic gain control for said digitized composite signal respective to said at least first and second components.

22. The method of claim 21, wherein said providing step comprises:

monitoring at least the respective powers of the demodulated down converted signals;

comparing the monitored respective powers against respective desired power levels; and adjusting gains for said at least first and second components based on said comparison.

23. The method of claim 21, further comprising providing an IF gain and an RF gain to the composite signal before said digitizing step, said IF gain providing step comprising:

monitoring at least the power of the digitized composite signal;

comparing the power of said digitized composite signal to a desired power level; and adjusting IF gain applied to said composite signal; and said RF gain providing step comprising:

monitoring changes in RF power of said composite signal; and adjusting RF gain of said an RF module of said SDARS receiver in response to changes in said RF power.

24. The method of claim 21, wherein said providing step comprises providing separate digital automatic gain control for said at least down converted first and second signals before said demodulating step.

* * * * *